Jan. 21, 1941.  A. R. METZGER  2,229,516
BUG DEFLECTOR
Filed Sept. 13, 1939  2 Sheets-Sheet 1

Inventor
Alfred R. Metzger
By Howard Fischer
Attorney

Jan. 21, 1941. A. R. METZGER 2,229,516
BUG DEFLECTOR
Filed Sept. 13, 1939 2 Sheets-Sheet 2

Inventor
Alfred R. Metzger
By Howard L. Fischer
Attorney

Patented Jan. 21, 1941

2,229,516

UNITED STATES PATENT OFFICE 2,229,516

BUG DEFLECTOR

Alfred R. Metzger, Bald Eagle, Minn.

Application September 13, 1939, Serial No. 294,641

10 Claims. (Cl. 296—91)

This invention relates to a bug deflector for automobiles and vehicles which is adapted to be placed over the front top portion of the radiator of an automobile so that the bugs coming toward the windshield will be deflected away from the same by the current of air influenced by the deflector and thus the windshield will be kept clear of bugs.

A feature of this deflector resides in providing a transparent shield or deflector which does not impair the view of the operator of the automobile and yet provides a means of deflecting the air passing toward the windshield of a car in such a manner that any bugs which have a tendency to be otherwise carried against the windshield will be deflected away from the same and thus the windshield is kept clean and a clear vision is provided therethrough.

A feature of this deflector resides in a shield-like member made of transparent or other suitable material which is adapted to be attached to the radiator grill by means of suitable spring fasteners or fasteners which are adapted to extend through holes in the shield and to engage in the radiator grill and thereby hold the deflector in the desired position. A very desirable position for the deflector is the apex forward portion of the radiator grill. The deflector is formed with upwardly extending wing portions at the sides thereof, which are bent slightly forward and which cause the wind currents to carry the bugs above and to either side of the car instead of toward it and thus the bugs are deflected away from the windshield.

The deflector projects slightly above the radiator grill and being transparent does not impair the vision, yet provides an air deflector of the desired nature.

My bug deflector may also be placed on the hood of the vehicle and attached by rubber suction cups with the transparent body of the same inclined toward the windshield so that the air current will be directed up and streamlined over the top of the vehicle. This sets up a current of air in front of the windshield which carries the bugs and insects away from striking the glass of the windshield.

It is also a feature to provide a bug deflector which may be formed with a frame-like portion extending down the sides and along the bottom to reinforce the same and providing a means of attaching the deflector to suction cup means or suitable means for securing the deflector in place.

Further, one or more deflectors may be used on the hood of the vehicle in front of the windshield.

My deflector may be made approximately triangular in shape and provided with side frame members which extend down sufficiently to engage low radiator grills or to permit the deflector to be secured at a lower point when it is desirable.

These features together with other details and objects of my invention will be more fully hereinafter set forth.

In the drawings forming a part of this specification:

Figure 1:
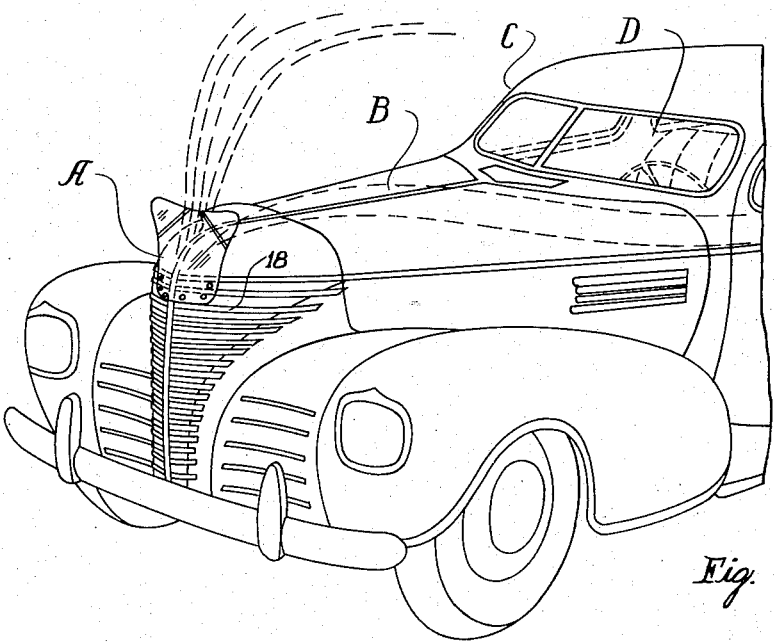
Figure 1 is a front perspective view of a portion of an automobile, showing my transparent bug deflector attached to the radiator grill thereof.
Figures 2, 3:
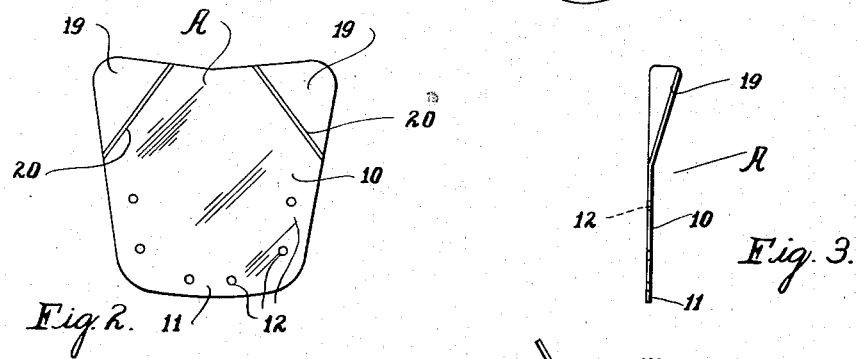
Figure 2 is a front view of my bug deflector when the same is detached from the automobile.
Figure 3 is a side view of the bug deflector, showing the forwardly projecting side wings.
Figure 4:
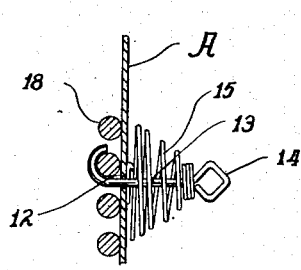
Figure 4 illustrates one form of coil spring for attaching the deflector.

The bug deflector A is made of transparent Celluloid or other suitable material and has a body portion 10 which is formed like an inverted shield, being broader at the top.

The lower end 11 of the bug deflector A is provided with a series of holes 12 for receiving the shank 13 of the hook rod 14. The rod 14 extends through the helical spring 15 and is adapted to compress the same to attach the bug deflector to the radiator grill.

Figure 5:
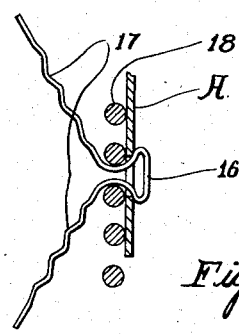
Figure 5 illustrates another form of spring rivet for attaching the deflector to the radiator grill.
Figure 6:
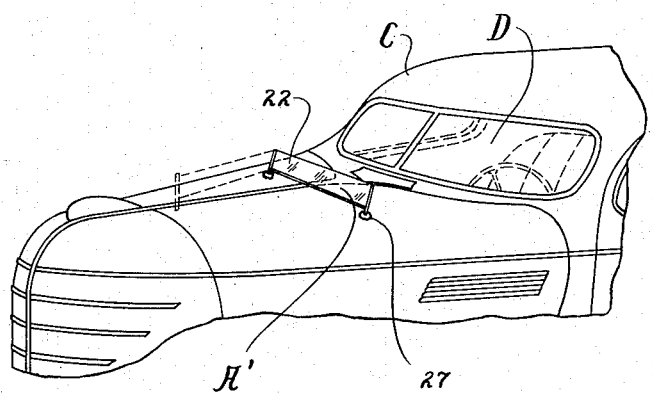
Figure 6 is a detail of a front perspective view of an automobile, showing another position for my bug deflector on the hood in front of the windshield.

The deflector A may also be attached by a flat wire spring rivet 16 which has corrugated spring end portions 17 which expand behind the grill work 18, as illustrated in Figure 5.

The body 10 of the bug deflector A is preferably made of transparent Celluloid or other suitable transparent material, however, it is apparent that the deflector may be made of any suitable material. The reason it is desirable to form the bug deflector A of transparent material is because when the deflector is attached to the upper radiator grill, as illustrated in Figure 1, the upper broader portion of the body of the same which forms the side air deflecting wings 19, projects above the engine hood B of the automobile C, and unless the shield A is of transparent material, the driver's vision may be partially impaired. Thus it is very desirable that the bug deflector A be made of transparent material.

The upper portion of the shield A is broadened out and from the sides of the same the air deflecting wings 19 project forwardly. The body 10 is scored along the lines 20 to form a stiffening rib extending diagonally across the corner of the upper portion and thus providing a rigidity to the air deflecting wings 19 in the body 10 of the shield A. When the shield A is attached to the radiator grill as indicated in Figure 1, the movement of the car C which causes air to pass over the radiator grill and the hood B, will be deflected by the bug deflector A, owing to the nature of the wings 19, so that the air will be deflected toward the side of the automobile and away from the windshield D, as indicated by the dotted lines in Figure 1.

Thus bugs are deflected away from the windshield, keeping the same clear to give a full, clear vision for the operator of the automobile, and thereby in a simple, efficient and desirable manner overcoming the necessity of frequently cleaning the windshield of the automobile in its operation, of bugs which otherwise would lodge upon the same and many times seriously impair the vision of the driver. Not only does my bug deflector keep the windshield clear, but it does not impair the vision of the driver and thus is more desirable because being of a transparent nature, it is hardly visible when made of crystal clear transparent material.

While my bug deflector A is illustrated in the form of a shield, having a particular formation, it is apparent that the same may be enlarged or extended so as to be attachable to lower radiator grills and so that it may be secured to the automobile in a manner to deflect the air currents which ordinarily pass over the windshield.

My bug deflector may be made in the form A', illustrated in Figures 6, 7, 8 and 9. In this form, my deflector has a rectangular transparent body portion 22, which is adapted to be supported on the ends by the upright frame portions 23 and along the lower edge by the cross frame portion 24.

Figure 11:
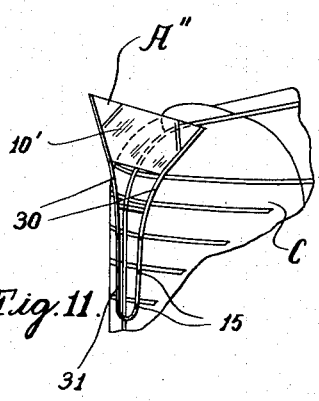
Figure 11 is a perspective of another form of my bug deflector as it would appear in use.
Figure 7:
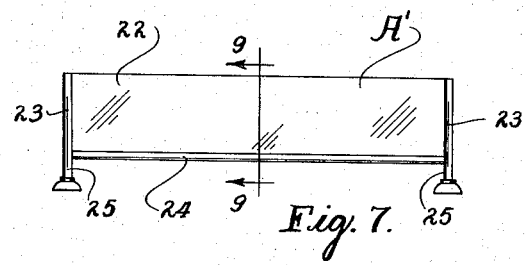
Figure 7 is a front elevation of the deflector illustrated in Figure 6.
Figure 12:
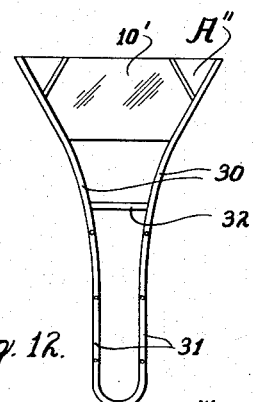
Figure 12 illustrates a front elevation of my bug deflector shown in Figure 11.
Figures 8, 9:
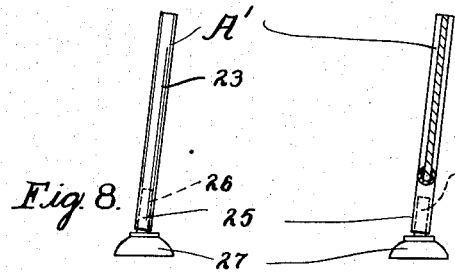
Figure 8 is a side elevation of the deflector illustrated in Figure 7.
Figure 9 is a section on the line 9—9 of Figure 7.
Figure 10:
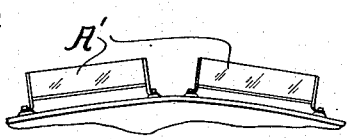
Figure 10 is a diagrammatic front view of a pair of deflectors used on the hood of the automobile.

The side frame members 23 are provided with a lower end 25 that frictionally engages with the member 26. The member 26 is secured to the suction cup 27 and extends up from the same. Thus when it is desirable to raise one side of the hood of the automobile, it is only necessary to lift one side of the frame of the deflector A', so as to disengage the end 25 from the portion 26 of the suction cup, leaving the suction cup 27 attached to the hood. Then the freed side of the deflector A' may be swung around toward the other side of the hood, permitting the side from which the deflector has been disengaged to be raised. After the hood is lowered the deflector A' may be again attached to the suction cup 27 by uniting the portions 25 and 26 by frictional engagement. The deflector A' is formed so that it will tilt backward toward the windshield D of the vehicle C, and thus provide an air deflector in front of the windshield and cause bugs and insects to be deflected upward over the top of the motor vehicle C.

Where the automobiles C are formed with a low grill in the front, I provide the bug deflector A", illustrated in Figures 11 and 12, which is provided with a substantially rectangular transparent body portion 10'. In this form, side frame members 30 support the ends of the body 10' and extend down into the long end portion 31. The end portion 31 may be secured to the grill by springs 15 engaging through suitable openings in the lower portion 31 of the frame. A suitable cross frame member 32 may be provided to connect the side frame portions 30 to strengthen the same.

It is apparent that the deflectors A and A" may be positioned at the desired height above the front of the radiator of the vehicle C so as to form the necessary deflecting means ahead of the windshield D to deflect the bugs therefrom. It is also apparent that the shields A and A' can be of any desired width.

I have found that my deflector will also deflect rain away from the windshield in certain speeds of driving a motor vehicle so that the rain does not impair the vision through the windshield.

Figure 13:
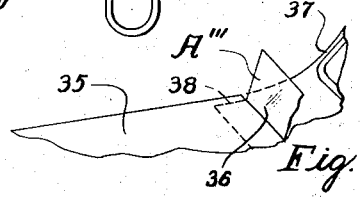
Figure 13 illustrates a detail showing an alternative form of my bug deflector held in position by the rear edge of the engine hood.

Figure 13 illustrates a detail showing another form of my bug deflector held in position by the rear edge of the engine hood 35. In this form the bug deflector A''' is formed of transparent material and extends along the rear edge 36 of the engine hood 35, slanting slightly toward the windshield 37 and having an inner foot portion 38 held in place by the hood. This bug deflector A''' deflects the air upward or substantially vertically up away from the windshield 37, causing the bugs to sweep upward and over the top of the car C.

In accordance with the patent statutes I have described the principles of operation and formation of my bug deflector, and while a particular form and construction of the same has been illustrated, I desire to have it understood that the same may be varied within the scope of the following claims without departing from the spirit and intent of the invention.

I claim:

1. A transparent bug deflector for a vehicle having a windshield and a body projecting forwardly with respect to the windshield, the deflector including a shield-like body portion formed of transparent material, means attaching the same in a substantially upright position forwardly of the hood of the vehicle, and wing-like members projecting from the sides of said body portion whereby air is deflected away from the windshield of the vehicle and bugs are kept from striking the same.

2. A bug deflector for automobiles and the like, including a transparent body portion having a shield-like formation, means for securing the same to the front of the vehicle to project above the hood thereof in a substantially upright position forwardly of the hood of the vehicle, and air deflector means formed in said shield to cause air currents to be set up in a manner to deflect bugs away from the windshield and prevent them from striking the same.

3. A windshield bug deflector for motor vehicles including a transparent generally flat shield-like body portion, means for attaching said body portion to the motor vehicle in a manner to cause the upper portion thereof to project in a substantially upright position above and forwardly of the hood of the vehicle, and air deflecting wings formed on said body portion whereby air is deflected away from the windshield to keep the same free of bugs and thus prevent impairing the vision of the driver.

4. A bug deflector for motor vehicles, comprising a flat body portion formed of transparent material, means for attaching said body portion to the motor vehicle in upright position forwardly of the vehicle hood and projecting above the surface of the same, air deflecting means formed in said body portion to set up a current of air toward the sides and over the top of the motor vehicle to deflect bugs away from the windshield thereof.

5. A transparent bug deflector for a motor vehicle having a windshield and a hood projecting forwardly with respect thereto, a transparent shield in upright position forwardly of, and projecting above the level of the hood of the vehicle, and means formed in said body portion to set up air currents that carry the bugs above and to either side of the windshield of the motor vehicle.

6. A transparent bug deflector for a vehicle having a windshield, and a hood projecting forwardly with respect thereto, a substantially flat flexible transparent sheet-like body portion, secured forwardly of, and projecting above the level of, the vehicle hood, wings formed on the sides of the top of the same bent at an obtuse angle to said body portion providing air deflectors, and means for stiffening said body portion adjacent said wings to provide the desired rigidity thereto.

7. A bug deflector for an automobile having a windshield, and a hood projecting forwardly with respect thereto sloping forwardly and downwardly at the front, the deflector comprising a substantially flat transparent body portion, frame means for supporting and reinforcing said body portion, and means attaching said frame to the forwardly and downwardly sloping hood end of the automobile whereby the body may extend above the level of the hood and forwardly thereof in a substantially upright position.

8. A bug deflector for automobiles, having a windshield and a hood projecting forwardly with respect thereto, the deflector comprising a generally flat transparent body portion, and means supporting said body portion in a substantially vertical plane forwardly of the vehicle hood and projecting above the level of the same.

9. A bug shield for vehicles having a windshield and a hood, the shield including a substantially flat transparent body portion adapted to act as an air deflector, and means attaching said flat body portion in a substantially upright position forwardly of the hood of the vehicle to project above the level of the hood.

10. A bug shield for vehicles having a windshield and a hood, the shield including a transparent body portion adapted to act as an air deflector, and means attaching said flat body portion in a substantially upright position forwardly of the hood of the vehicle with the upper edge thereof substantially above the lower edge thereof.

ALFRED R. METZGER.